3,073,803
EPOXY ALKYL CONDENSATES WITH AROMATIC HYDROCARBON POLYCARBOXYLIC ACIDS AND PROCESS OF MAKING SAME
Bernhard Raecke and Rudolf Köhler, Dusseldorf, Germany, and Helmut Pietsch, Geneva, Switzerland, assignors to Henkel & Cie. G.m.b.H., Dusseldorf-Holthausen, Germany, a corporation of Germany
No Drawing. Filed Nov. 26, 1958, Ser. No. 776,448
14 Claims. (Cl. 260—78.4)

This application is a continuation-in-part of our co-pending applications, Serial No. 380,133, filed September 14, 1953, issued as Patent No. 2,865,897; Serial No. 377,713, filed August 31, 1953, now abandoned; Serial No. 381,766, filed September 22, 1953, now abandoned; and Serial No. 392,511, filed November 16, 1953, now abandoned.

This invention relates to expoxide compounds, and more particularly to higher molecular weight epoxide compounds having more than one epoxy group in their molecule, to a method of making same, and to compositions of these higher molecular weight epoxide compounds with hardeners. The preferred epoxide compounds are the epoxy alkyl condensates with ortho- and iso-phthalic acids.

Higher molecular epoxide compounds, especially compounds having more than one epoxy group in their molecule, have become of great importance in the production of plasticizers, stabilizers, plastics, synthetic fibers and adhesives. Compounds of this type are known which carry functional groups in their molecule. Heretofore, such functional groups have been either ether groups or sulfonic acid amide groups.

It is one object of this invention to provide new and valuable resinous high molecular weight epoxy alkyl condensates with (1) aromatic hydrocarbon dicarboxylic acid half-esters with polyhydric aliphatic low molecular weight alcohols, said half-esters containing at least two carboxyl groups per molecule, (2) polycyclic aromatic hydrocarbon dicarboxylic acids, (3) aromatic hydrocarbon polycarboxylic acids containing more than two carboxyl groups, (4) orthophthalic acid and (5) isophthalic acid.

Another object of this invention is to provide simple and effective processes of making such new and valuable epoxide compounds by means of readily available starting materials.

A further object of this invention is to provide new resinous compositions useful as adhesives and molding resins containing the resinous epoxy alkyl condensates enumerated above with various acid and alkaline hardeners.

A further object of this invention is to provide epoxy resin products which are of great value in the plastics and artificial fiber industry.

Other objects of this invention and advantageous features thereof will become apparent as the description proceeds.

The new and valuable resinous epoxide compounds according to our invention are produced by (1) reacting salts of aromatic hydrocarbon polycarboxylic acids at increased temperature and pressure with epoxides having one or more exchangeable halogen atoms in their molecule, such as the vic-epoxy lower alkyl halides, or by (2) reacting halides of aromatic hydrocarbon polycarboxylic acids with glycide, i.e. 2,3-epoxy-1-propanol, or its vic-epoxy lower alkanol homologues, preferably in the presence of agents capable of splitting off hydrogen halide.

As starting material for the first reaction above, one of the reaction components may be the alkali metal salts of (1) aromatic hydrocarbon dicarboxylic acid half-esters with polyhydric aliphatic low molecular weight alcohols, said half-esters containing at least two carboxyl groups per molecule, (2) polycyclic aromatic hydrocarbon dicarboxylic acids, (3) aromatic hydrocarbon polycarboxylic acids containing more than two carboxyl groups, (4) orthophthalic acid and (5) isophthalic acid. Such acids are, for instance, orthophthalic acid, isophthalic acid, mellitic acid, pyromellitic acid, naphthalic acid, 2,6-naphthylene dicarboxylic acid, tetrachlorophthalic acid, diphenyl-o,o'-dicarboxylic acid, diphenyl-p,p'-dicarboxylic acid, ethylene glycol-bis-(p-carboxy phenyl)-ether and the corresponding ethers of other glycols, such as trimethylene glycol- and tetramethylene glycol-bis-(p-carboxy phenyl)-ether, $\alpha,\beta$-bis-(p-carboxy phenyl) ethane, and others.

When especially high molecular weight epoxide compounds are to be produced, high molecular weight polycarboxylic acids are used as starting materials. Such high molecular weight polycarboxylic acids are, for instance, compounds which are obtained by reacting polycarboxylic acids with polyhydric alcohols to yield polyesters. Said acids and alcohols are used in such a proportion that more than one free carboxyl group per mol of resulting polyester is present therein. These polyesters containing more than one carboxyl group per mol are neutralized to yield the corresponding alkali metal salts. Said salts are then used for carrying out the reaction according to the present invention. Suitable polyesters may be obtained by esterifying in a known manner suitable amounts of the above-mentioned dicarboxylic acids; for instance, phthalic acid with polyhydric alcohols, such as glycols, glycerol, pentaerythritol, mannitol, or the like.

The reaction according to the present invention is preferably carried out with the alkali metal salts of said polycarboxylic acids, such as the potassium, sodium or lithium salts. We have found that the reaction proceeds especially well with the potassium salts.

The other reaction component containing exchangeable halogen and an epoxy group in its molecule is preferably epichlorohydrin which is readily available; however, the reaction may also be carried out in a similar manner with other vic-epoxy lower alkyl halides of the above-indicated type; for instance, with epibromohydrin, 1-chloro-3,4-epoxy-butane and others.

The reaction is preferably carried out in an autoclave, while stirring, at a temperature between about 115° C. and about 180° C., and preferably at 140° to 160° C. The reaction time and temperature must be adjusted according to the reactivity of the alkali metal salt group employed. Preferably the pressure used in this reaction is increased by forcing an inert gas into the reaction container. For instance, nitrogen pressures of between 5 atmospheres and 50 atmospheres have proven to be of advantage. Preferably the reaction is carried out with an excess of the epoxy halide compound. The excess may be as high as desired because the non-reacted epoxy halide compound is not changed during the reaction and can readily be recovered by distillation on working up the reaction mixture. The reaction may also be carried out in the presence of an inert solvent serving as diluting agent. Dioxane, for instance, has proved to be especially suitable for this purpose. After reaction is complete, the reaction product remains in solution in the excess of epoxy halide compound and/or in the solvent, if a solvent is used.

It has been found that the reaction requires the presence of a certain amount of water which, however, must not be too high. This amount of added water depends upon the salt used in the reaction. It is between 0.5% and 5% and usually between about 1% and about 3% calculated for the amount of salt employed. Preferably the amount of water is adjusted by drying the salt obtained from its aqueous solution to the appropriate water content. The salts are used in finely pulverized form. An especially reactive salt form is obtained by spray-drying aqueous solutions of the salts.

It has, furthermore, been found that especially valuable products are obtained when reacting the mixture of the salt of the aromatic hydrocarbon polycarboxylic acid with an epihalohydrin in the presence of α,ω-dihalohydrins, such as glycerol-α,γ-dichlorohydrin, or when first partly reacting said salt with an α,ω-dihalohydrin and thereafter condensing the reaction product with an epihalohydrin.

The reaction between the epoxy halide compound, such as epichlorohydrin, and the alkali salt of a polycarboxylic acid, such as potassium phthalate, consists essentially in an ester formation whereby an amount of alkali halide, such as potassium chloride, which amount is equivalent to the ester groups formed, is precipitated. In addition thereto, other reactions take place, such as polymerization reactions, which are not yet fully explained.

The reaction products can be worked up in a very simple manner. The excess halide is filtered off from the reaction mixture containing the reaction product and any solvent, if a solvent is used. The excess of epoxy halide may be recovered from the solvent by vacuum distillation. The reaction product usually remains in the form of a resinous, practically ash-free mass. The yield is excellent.

In our copending application Serial No. 380,133 we disclose and claim the second method of producing the resinous epoxide condensates by reacting dihalides of aromatic hydrocarbon dicarboxylic acids with glycide in the presence of organic bases, volatiles such as the solvent and especially unreacted glycide are distilled off from the reaction mixture, and condensation products containing resinous epoxy polymers of diglycide esters of the aromatic hydrocarbon dicarboxylic acids are obtained. Especially suitable as the halides for this reaction are the chlorides and bromides. The chlorides are preferable as they are readily available and comparatively inexpensive.

The organic bases which are present during the reaction serve the purpose of binding the hydrogen halide liberated during the reaction between the aromatic hydrocarbon dicarboxylic acid halide and the glycide, and must therefore be employed in approximately equivalent or stoichiometric amounts. Primarily useful as organic bases are tertiary organic nitrogen bases, such as trimethyl amine, triethyl amine, pyridine and dimethylaniline.

The reaction generally proceeds in the cold; that is, at temperatures of 0° C. on upwards to room temperature. After commencement, the reaction can be accelerated or brought to greater completion by mild heating to temperatures up to 80° C., but it is preferably to maintain the temperature below 60° C. In general, the reaction is carried out in the presence of low-boiling organic solvents, especially those aromatic in nature, such as benzene, toluene or xylene.

The products formed in these two processes are higher molecular weight, non-distillable, water-insoluble, hardenable, epoxide resinous condensation products, containing one to two glycide ester groups in their molecule. These products, containing a mixture of monomeric and lower molecular weight polymeric epoxy ester compounds, are formed by condensing an acid compound selected from the group consisting of alkali metal salts of aromatic hydrocarbon dicarboxylic acid half-esters with polyhydric aliphatic low molecular weight alcohols, said half-esters containing at least two carboxyl groups per molecule, alkali metal salts of polycyclic aromatic hydrocarbon dicarboxylic acids, alkali metal salts of aromatic hydrocarbon polycarboxylic acids containing more than two carboxyl groups, alkali metal salts of orthophthalic acid, alkali metal salts of isophthalic acid, polycyclic aromatic hydrocarbon dicarboxylic acid halides, acid halides of aromatic hydrocarbon polycarboxylic acids containing more than two carboxyl groups, orthophthalic acid dihalide and isophthalic acid dihalide, with an epoxy compound selected from the group consisting of vic-epoxy lower alkyl halides and vic-epoxy lower alkanols; said condensation products containing at least one epoxide group and not more than two epoxide groups per individual molecule in said condensation product, said epoxy compound being linked to said aromatic hydrocarbon dicarboxylic acid radical through a linkage selected from the group consisting of (1) ester linkages and (2) ether linkages to a glycerine radical linked to said aromatic hydrocarbon dicarboxylic acid radical through an ester linkage; said epoxide resinous composition having an average epoxide-oxygen content between 2.3% and 7.5%, an average molecular weight between 300 and 500, an average hydroxyl number between 270 and 350 and an average saponification number between 350 and 450.

Although nothing more accurate is known about the structure of these condensation products, the formation of two different groups of condensation products can be assumed as being probable. Assuming the reaction between an orthophthalic acid or isophthalic acid radical and a glycide radical, the following mixture of monomeric and low molecular weight polymeric epoxy ester compounds would result, containing primarily compounds selected from the group consisting of:

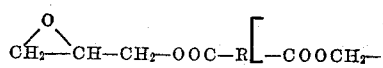 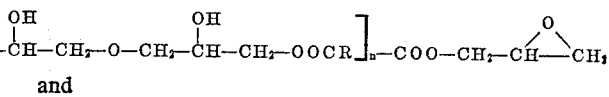

and

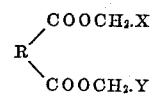

wherein $n$ is an integer from 0 to 3 and has an average value of between 0.5 and 0.9, R represents a bivalent radical selected from the group consisting of 1,2-phenylene and 1,3-phenylene radicals, X is selected from the groups consisting of $$-CHOH.CH_2OH$$

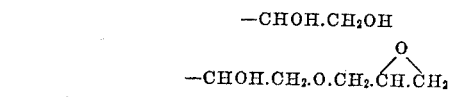

and $$-CHOH.CH_2.O.CH_2.CHOH.CH_2OH$$

radicals and Y is selected from the group consisting of

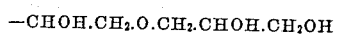

and

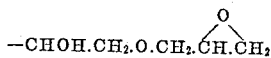

radicals, said epoxide resinous composition having an average epoxide-oxygen content between 3.1% and 6.8%, an average molecular weight between 300 and 500, an average hydroxyl number between 270 and 350 and an average saponification number between 390 and 450.

Among the various epoxide compounds which would result from the condensation reactions, assuming a phthalic acid starting material, are the following:

| | | Molecular Weight | Epoxide-oxygen Content, percent | Hydroxyl Number | Saponification Number |
|---|---|---|---|---|---|
| (I) | Ph(—COO.CH₂.CH(O)CH₂)(—COO.CH₂.CH(O)CH₂) | 278 | 11.5 | 0 | 403 |
| (II) | Ph(—COO.CH₂.CHOH.CH₂OH)(—COO.CH₂.CH(O)CH₂) | 296 | 5.4 | 380 | 380 |
| (III) | Ph(—COO.CH₂.CHOH.CH₂.O.CH₂.CH(O)CH₂)(—COO.CH₂.CHOH.CH₂OH) and Ph(—COO.CH₂.CHOH.CH₂.O.CH₂CHOH.CH₂OH)(—COO.CH₂.CH(O)CH₂) | 370 | 4.3 | 454 | 303 |
| (IV) | Ph(—COO.CH₂.CHOH.CH₂.O.CH₂.CH(O)CH₂)(—COO.CH₂.CHOH.CH₂.O.CH₂.CH(O)CH₂) | 426 | 7.5 | 264 | 264 |
| (V) | Ph(—COO.CH₂.CH(O)CH₂)(—COO.CH₂.CHOH.CH₂.O.CH₂.CH(O)CH₂) | 352 | 9.1 | 159 | 309 |
| (VI) | Ph(—COO.CH₂.CHOH.CH₂.O.CH₂.CHOH.CH₂OH)(—COO.CH₂.CHOH.CH₂.O.CH₂.CH(O)CH₂) | 444 | 3.6 | 505 | 253 |
| (VII) | Ph(—COO.CH₂.CHOH.CH₂.O.CH₂.CHOH.CH₂.OOC—Ph—COO.CH₂.CH.CH₂.O)(—COO.CH₂.CH(O)CH₂)(CH₂.CH.CH₂.OOC—Ph) | 574 | 5.6 | 195 | 301 |

The constants and analytical values found for the above products show that these compounds are present in the compositions produced according to our invention. Which compounds are produced and to what extent they undergo polymerization depends upon the reaction duration, reaction temperature, specific reactivity of the salt group, and especially upon the water content of the reaction mixture.

The epoxide-oxygen content of the reaction product is determined in a manner known per se by titrating the hydrochloric acid which is consumed by reacting the epoxide with a hydrochloric acid-pyridine solution or with a hydrochloric acid-dioxane solution.

The molecular weight is determined cryoscopically. The values found and given refer to the entire reaction product obtained in each given case.

On determining the hydroxyl number, the epoxy groups present in the reaction product are also reacted and determined; and, likewise, on determining the saponification number, any halogen present therein also reacts. Consequently, a corresponding correction must be made in reporting said values.

As stated above, the new epoxy alkyl condensates are valuable intermediates, especially in the preparation of adhesives, casting or potting resins and in the artificial fiber industry.

All of these products obtained in accordance with the invention may be employed for the production of hardenable compositions, provided that they contain on the average of more than one and at least two epoxide groups in the molecule. Hardeners which may be employed for this purpose are both acidic and alkaline hardeners. Among the acidic hardeners are, for example, anhydrides of hydrocarbon di- and polycarboxylic acids with 4 to 20 carbon atoms, preferably with 4 to 10 carbon atoms. Such compounds include, for example, the anhydrides of maleic acid, adipic acid, sebacic acid, phthalic acid, terephthalic acid, tetrahydrophthalic acid, pyromellitic acid, etc. In addition, the adducts formed by the addition of 1 to 2 mols of maleic acid anhydride to 1 mol of dipentene may be used as hardeners. Other acid hardeners are inorganic and organic acids, such as phosphoric acid, phosphorus pentoxide, sulfuric acid, p-toluene sulfonic acid, sulfo-salicylic acid, phthalic acid, o-phenylene-cyclophosphoric acid, monobutyl-orthophosphoric acid, and the like. In place of the free acids or the acid anhydrides, other acid compounds, such as the acid halides and especially the acid chlorides of organic or inorganic acids, can be used. Acid halides suitable for the purpose of this invention are, for instance, phthalic acid dichloride, terephthalic acid dichloride, sebacic acid dichloride, naphthalene disulfonic acid dichloride, toluene sulfochloride, phosphorus oxychloride, and others. Certain phenols, such as resorcinol, alkyl hydrocarbons substituted by two or more phenol residues, such as $\beta,\beta$-(4-hydroxy-phenyl)-propane and the like, have also proven to be effective acid-reacting hardening agents. For alkaline or basic hardening, organic nitrogen bases which contain primary, secondary or tertiary nitrogen atoms once, twice or several times in the molecule, and containing at least one amino radical having at least one hydrogen atom bonded to the nitrogen atom, may be used as hardeners. Examples of such compounds are ethylene diamine, diethylene triamine, triethylene tetramine, piperidine, dicyandiamide, diacetoneamine, benzidine, p,p'-diamino-diphenyl methane, reaction products formed by aliphatic polyamines with dicyan-diamide, and others.

It is also possible to use as alkaline hardening agents alkaline reacting compounds which are partly or wholly of inorganic nature, such as sodium hydroxide, calcium hydroxide, calcium oxide (caustic lime), and others.

For purposes of hardening, a mixture is formed with the resinous epoxide condensation products and the hardener. If both of these substances are liquids, they are merely poured together. If one of the two substances is a liquid and the other a solid, the substances may be admixed with each other and the mixture heated until everything is in the molten state.

The hardeners are generally used in quantities ranging from 5 to 60% by weight based upon the weight of the mixture of resinous epoxide condensation products and hardener. For each mixture of these condensation products and any particular hardener there is a certain relatively narrow range within which optimum values can be reached. For small additions of hardeners, within the range of 5 to 10% by weight, amines are preferably used.

When our compositions are used as adhesives, we have found that plasticizers frequently improve the quality of the adhesive bond. Suitable plasticizers for this purpose are plasticizers such as normally used in the plastics industry, provided they are compatible with the epoxy alkyl esters of polycarboxylic acids used in the present invention. Especially suitable plasticizers are, for example, dibutyl phthalate and tricresyl phosphate.

Other epoxy compounds, such as glycide ethers of polyvalent phenols or compounds which contain only one epoxy group in their molecule, such as phenyl glycide ether or fatty acid glycide esters, the epoxide compounds of drying oils, butadiene oxides, or glycide itself, may also be admixed with the adhesive compositions produced according to the present invention.

In general, liquid and sometimes also viscous or molten epoxy alkyl esters of polycarboxylic acids in admixture with about 5% to about 60% of said hardening agents are applied to and coated on the materials to be glued or cemented, in order to effect such gluing or cementing.

When plasticizers and/or monoepoxide compounds are used, it is advisable first to admix said plasticizers and/or epoxide compounds with said epoxide esters and then add the hardening agent. Care must be taken to intimately mix all constituents of the adhesive compositions according to this invention before use. To accomplish such intimate mixing it is often of advantage to use solutions of said esters in volatile solvents, such as ethers, ketones, and the like, and to remove as much of said solvents as possible by evaporation or otherwise before setting.

Should only a comparatively low quality of the adhesive bond be required, the adhesive composition may also be blended and diluted with other materials, such as fillers, known adhesives, and the like. As fillers there may be used, for instance, wood flour, rock dust, and the like. Known adhesives which may be admixed are, for instance, animal glue, starch and starch derivatives, cellulose derivatives, phenol formaldehyde resins, urea formaldehyde resins, melamine formaldehyde resins, and the like.

As stated above, adhesive compositions according to the present invention are of special advantage because the adhesive layer, after hardening, does not shrink. Consequently, the adhesive layer is free of inner tension or stress. On account thereof, one may apply without any danger and difficulty, thick layers of the adhesive composition. The surfaces to be glued or cemented together need not exactly fit each other. Absence of tension or stress in the adhesive layer has the further important advantage that it is not necessary to use pressure when gluing or cementing two parts of an article. It is readily possible to unite articles to be glued or cemented by very slight pressure of a screw clamp or the like. Applying stronger pressure is of no advantage.

In order to harden with the acid hardeners it is necessary to heat the mixture to temperatures within the range of 80 to 200° C., preferably between 100 and 180° C. The basic hardeners effect a hardening action at much lower temperatures, preferably at room temperature, but such mixtures can also be hardened or post-hardened at elevated temperatures. Quite generally—that is, in the case of acid hardeners as well as in the case of basic hardeners—an improvement in the mechanical properties of the hardened resin can be achieved by post-hardening at the hardening temperature or at temperatures above the hardening temperature.

The epoxide esters according to the present invention may, in admixture with hardeners, be used as adhesives for a variety of materials, such as paper, cardboard, wood or other cellulose-containing materials, textiles, porcelain, stoneware or other ceramic materials, glass, metals, such as iron, aluminum, copper, etc. They may be used as adhesives between identical materials as well as between different materials.

In addition, the epoxide esters according to the present invention may, together with hardeners, be used as molding resins. These molding resins may either be used to produce shaped objects having a relatively complicated structure, such as are difficult to obtain by other means, or may be used to fill empty spaces in apparatus of all types. This process is often used for fixing connections of electrical cables. For example, entire circuits or electrical apparatus which include a great number of soldered connections may be molded into hardenable resin mixtures according to the present invention, so that upon hardening of the resin mixture a resin block is formed in which the electrical cables are protected from rupture or mechanical damage.

The particular advantage of the epoxide ester condensation products with polycarboxylic acids and of the hardened resins obtained therefrom is their high-temperature resistance.

The following examples serve to illustrate this invention without, however, limiting the same thereto.

*Example 1*

121 gm. of finely pulverized and sieved dipotassium orthophthalate (½ mol) which contains 2.8% of water are heated with 325 gm. of epichlorohydrin (about 3.5 mols) in a one-liter autoclave at 180° C. for 8 hours. Before heating is started, the air in the autoclave is replaced by nitrogen. The total pressure during the course of reaction amounts to 13–16 atmospheres.

Precipitated potassium chloride is filtered off from the light-brownish reaction mixture. The potassium chloride is washed with epichlorohydrin and is dried in a vacuum. 70 gm. are obtained corresponding to 97% of the theoretical amount. The excess of epichlorohydrin in the filtrate is distilled off, at the end in a vacuum of 4–5 mm.

mercury at a bath temperature of 150° C. to 170° C. until no more volatile distillate passes over. 120 gm. of a dark-brown clear resin which is still fluid at room temperature are obtained, corresponding to 86% of the theoretical amount calculated for esterification. This resin has the following characteristic constants and analytical values:

| | |
|---|---|
| Epoxide-oxygen content _____percent__ | 6.4 |
| Chlorine content _____do____ | 2.3 |
| Saponification number _____ | 392 |
| Hydroxyl number _____ | 275 |
| Ash content _____percent__ | 0.03 |
| Mean molecular weight (dioxane) _____ | 360 |

The reaction product is soluble in acetone, dioxane, benzene (turbid solution), chloroform, methylene chloride, acetic acid ethyl ester; insoluble in water, petroleum ether, ether, alcohol, carbon tetrachloride, carbon disulfide and toluene.

When the same materials are reacted without pressure but while stirring, boiling under reflux, and in a nitrogen atmosphere, for 20 hours at an oil bath temperature up to 190° C. and working up the reaction mixture in the same manner as described above, only 10 gm. of the resin are obtained, and only 3 gm. of the dipotassium phthalate are reacted.

*Example II*

100 gm. of dipotassium orthophthalate containing 2.8% of water and 280 gm. of epichlorohydrin are heated under an initial nitrogen pressure of 5 atmospheres gauge at 130° to 140° C. for 12 hours. The reaction mixture, on working up in the same manner as described in Example I, yields 90 gm. of a resin of the following characteristic constants and analytical values:

| | |
|---|---|
| Epoxide-oxygen content _____percent__ | 5.7 |
| Chlorine content _____do____ | 1.7 |
| Saponification number _____ | 420 |
| Hydroxyl number _____ | 355 |
| Ash content _____percent__ | 0.0 |
| Mean molecular weight (dioxane) _____ | 435 |

When using dipotassium phthalate which contains only 0.4% of water, the yield is decreased 50%.

*Example III*

1300 gm. of very finely pulverized neutral dipotassium orthophthalate containing 2.8% of water and 3400 gm. of epichlorohydrin are heated in a 12-liter autoclave provided with a stirrer, at 50 atmospheres gauge of nitrogen and at a temperature of 140° C. to 150° C. for 16 hours, while stirring. After cooling, the precipitated salt is filtered off and is washed several times with epichlorohydrin. Filtrate and wash liquid are combined and are worked up as described in Example I. 1330 gm. of a resin are obtained, corresponding to 88% of the theoretical amount calculated as phthalic acid diglycide ester. The product has the following characteristic constants:

| | |
|---|---|
| Epoxide-oxygen content _____percent__ | 6.8 |
| Chlorine content _____do____ | 1.5 |
| Saponification number _____ | 403 |
| Hydroxyl number _____ | 270 |
| Ash content _____percent__ | 0.0 |
| Mean molecular weight _____ | 442 |

*Example IV*

121 gm. of dipotassium orthophthalate containing 2.8% of water, 280 gm. of epichlorohydrin and 220 cc. of dioxane are reacted in an autoclave at 100° C. for 8 hours.

55 gm. of a resin (corresponding to 25% of the theoretical amount) are isolated by working up the reaction mixture in the same manner as described in Example I. Its analytical data and characteristic constants are:

| | |
|---|---|
| Epoxide-oxygen content _____percent__ | 3.6 |
| Chlorine content _____do____ | 5.0 |
| Saponification number _____ | 393 |
| Hydroxyl number _____ | 329 |
| Ash content _____percent__ | 0.0 |
| Mean molecular weight _____ | 253 |

*Example V*

105 gm. of disodium orthophthalate (0.5 mol) containing 3.8% of water are heated with 300 gm. of epichlorohydrin in an autoclave under nitrogen at an initial pressure of 5 atmospheres gauge to 140° C. to 150° C. After cooling, 55 gm. of sodium chloride (94% of the theoretical amount) are filtered off. The filtrate is distilled at a vacuum of 8 mm. mercury at a bath temperature of 165° C. until no more volatile distillate passes over. 152 gm. of a light viscous resin remain, corresponding to 109% of the theoretical amount. This resin has the following characteristic constants and analytical values:

| | |
|---|---|
| Epoxide-oxygen content _____percent__ | 3.1 |
| Chlorine content _____do____ | 5.9 |
| Saponification number _____ | 332 |
| Hydroxyl number _____ | 350 |
| Ash content _____percent__ | 0.05 |
| Mean molecular weight _____ | 490 |

*Example VI*

444 gm. of orthophthalic acid anhydride (3 mols), 180 gm. of butanediol-(1,4) (2 mols), and 3 gm. of zinc chloride are heated under reflux to 200° C. to 210° C. for 2 hours, while passing nitrogen through the mixture. The reflux cooler is then replaced by a descending cooler and most of the water formed on reaction is distilled off at 200° C. for 10 hours, first in a partial vacuum; thereafter the residual water and any volatile components of the reaction mixture are distilled off in a vacuum of 1 mm. mercury. The distillation residue is washed several times with boiling water and yields a dark, wax-like product having an acid number of 200–210.

520 gm. of said polyester are dissolved in 4 liters of acetone. A solution of 110 gm. of potassium hydroxide in 400 cc. of water are added thereto to cause conversion into the neutral potassium salt. After distilling off the acetone, and drying the salt for 2 days at 130° C. in a vacuum drying chamber, a dark, wax-like mass is obtained.

150 gm. of said potassium salt of the polyester carboxylic acid and 300 gm. of epichlorohydrin are heated in an autoclave provided with a stirrer or adapted for shaking under nitrogen at an initial pressure of 5.5 atmospheres gauge to 160° C. for 6 hours. 225 gm. of a dark resin which is almost non-fluid at room temperature are obtained.

*Example VII*

121 gm. of dipotassium orthophthalate (0.5 mol), 32 gm. of glycerol-α, γ-dichlorohydrin (0.25 mol), and 185 gm. of epichlorohydrin (2 mols) are heated in an autoclave under nitrogen at an initial pressure of 5 atmospheres gauge at 160° C. for 6 hours. 74 gm. of potassium chloride corresponding to 100% of the theoretical amount are formed. On working up the filtrate according to Example 1, 168 gm. of a resin are obtained which has the following characteristic constants and analytical values:

Epoxide-oxygen content _____percent__ 2.3
Chlorine content _____do____ 2.0
Saponification number _____ 356
Hydroxyl number _____ 340
Mean molecular weight _____ 330

Example VIII 121 gm. of dipotassium orthophthalate (0.5 mol), 48 gm. of glycerol-α, γ-dichlorohydrin (⅜ mol), and 300 cc. of dioxane are heated under reflux at an initial nitrogen pressure of 5 atmospheres gauge for 8 hours, while stirring. 185 gm. of epichlorohydrin (2 mols) are added to said mixture and the reaction mixture is heated in an autoclave under nitrogen at 160° C. for 6 hours. When working up the reaction mixture according to Example I and distilling the filtrate at a vacuum of 4 mm. mercury, and at a bath temperature up to 150° C., a resinous residue amounting to 106 gm. is obtained. 82 gm. of impure potassium chloride are recovered on filtration. The residuous condensation product has properties and characteristic constants similar to those of the product obtained according to Example VII.

The following examples describe the technical use of the products obtained in accordance with the previous examples in conjunction with hardening the same into unmeltable and organic solvent-insoluble resins. Even though the following examples describe the further treatment of a certain product in accordance with one of the preceding examples, it must nevertheless be taken into consideration that each of the products in the preceding examples may be used for the particular purpose; that is, for the purpose of hardening, each of the preceding epoxide condensation products can be mutually exchanged for each other and, except for minor variations, substantially the same results are obtained.

EXAMPLES OF ALKALINE OR BASIC HARDENING

Example IX 2 parts by weight of the resin of Example III are mixed with 0.1 to 0.5 part by weight of diethylene triamine. A clear yellowish-brown viscous mixture is obtained which gradually hardens and after one hour is so hard that it is resistant to the pressure exerted by the fingernail and cannot be indented thereby.

Example X

PREPARATION OF "HARDENING AGENT 31"

A basic hardening agent of high efficiency is made in a manner known per se by condensing diethylene triamine and dicyandiamide. 100 gm. of dicyandiamide and 300 gm. of diethylene triamine are condensed in the course of three to five hours during which the temperature is gradually increased to about 250° C. Thereby a yellowish viscous liquid is formed which is designated hereinafter as "Hardening Agent 31."

The following table gives some data for adhesive bonds produced by gluing together sheets of duraluminum by means of an adhesive composition comprising the resin of Example III, Hardening Agent 31 or diethylene triamine, and, where indicated, phenyl glycide ether as plasticizer, said sheets being of a width of 2 cm. and a thickness of 2 mm. The sheets overlap each other about 1 cm. After application of the adhesive composition according to this example to said sheets they were held together without any substantial pressure by means of clamps until hardening of the adhesive had taken place. This procedure was also followed in the subsequent examples.

TABLE

| Resin of Example III, gm. | Addition of phenyl glycide ether, gm. | Addition of Hardening Agent 31, gm. | Hardening time at room temperature, hours | Shear strength after 24 hours, kg./mm.² |
|---|---|---|---|---|
| 2.0 | 0.0 | 0.2 | 2 | 0.6–0.7 |
| 1.8 | 0.2 | 0.2 | 2.5 | 1.0 |
| 1.6 | 0.4 | 0.2 | 3.5 | 0.7–0.9 |
| 1.4 | 0.6 | 0.2 | 4–5 | 0.1 (too soft) |
| | | Addition of diethylene triamine, gm. | | |
| 2.0 | 0.0 | 0.2 | 2.5 | 0.6 |
| 1.8 | 0.2 | 0.2 | 3 | 0.5–0.6 |
| 1.6 | 0.4 | 0.2 | 3–4 | 1.2–1.3 |
| 1.4 | 0.6 | 0.2 | 3–5 | 0.6 |

Example XI

The resin of Example III is mixed with 10% of its weight of dibutyl phthalate and 10% of its weight of Hardening Agent 31. Scarfed pieces of pinewood with a proportion of their scarf joint of 1 to 4 are coated therewith, loosely clamped, and after 24 hours subjected to a tearing test. With a glued surface af about 4 sq. cm. a partial breaking of the adhesive joint and a partial and extensive breaking of the wood near the adhesive joint take place at a breaking load of 80–100 kg./cm.². Boiling such glued pieces in water for 6 hours permits breaking of the adhesive joint at 26.7 to 30 kg./cm.². After storing the glued pieces for 92 hours in water the breaking load is 50 to 60 kg./cm.².

Example XII 10 parts by weight of the resin of Example III, 1 part by weight of E-caprolactam, and 0.5 part by weight of piperidine are melted together and are applied to sheet metals. The metals are united by exposing them to a temperature of 130–140° C. for six hours. After cooling, shear strengths of 2.5 to 2.8 kg./mm.² are measured.

Example XIII 10 parts by weight of the resin of Example III, 3 parts by weight of the glycide ester mixture of fatty acids having 9 to 11 carbon atoms, and 1 part by weight of piperidine are mixed with each other. The mixture is spreadable at room temperature. It is applied to sheet iron and is hardened at 100° C. Firm, elastic adhesive bonds are produced thereby.

Example XIV 37 gm. of glycide, 55 gm. of triethylamine and 200 cc. of toluene are mixed. A solution of 87.6 gm. of p-toluene sulfochloride and 100 cc. of toluene are added thereto within one-half hour, while cooling with water. Stirring of the reaction mixture is continued for several hours and the mixture is allowed to stand overnight. After filtering off tri-ethylamine chlorohydrate and distilling off toluene, a yellow clear oil is obtained as distillation residue. It represents the glycide ester of p-toluene sulfonic acid.

10 parts by weight of the resin of Example III, 1 part by weight of p-toluene sulfonic acid glycide ester, and 1 part by weight of triethylene tetramine are intimately mixed with each other. A readily spreadable mass is obtained which is viscous at room temperature. Aluminum sheets united by means of said adhesive composition exhibit a shear strength up to 1.5 kg./mm.² after storing for 24 hours at room temperature.

Example XV 2 parts by weight of the resin of Example III are intimately mixed with 0.2 to 0.4 part by weight of dibutyl phthalate or the same amount of tricresyl phosphate. 0.2 part by weight of diethylene triamine are added thereto. The light-brownish clear composition, immediately after its preparation can be applied to surfaces to be glued or cemented by means of a brush. After three hours it is still soft but does not permit application by a brush. After six hours the composition is solid. The tear resistance of duraluminum glued or cemented together in this manner is about 1.3 to 1.5 kg./mm.$^2$ when measured after 24 hours.

EXAMPLES OF ACIDIC HARDENING

Example XVI 2 parts by weight of the resin of Example III are melted together with one part by weight of phthalic acid anhydride at 120–140° C. Immediately thereafter, the molten mixture is cooled and a yellowish-brown product is obtained. Said mixture is brittle at room temperature and melts at 70–80° C.

Applying said mixture in molten or powder form to duraluminum sheets, uniting said coated sheets under slight pressure, and heating the united sheets to 130° C. effect hardening of the adhesive composition within 5 to 10 minutes without any formation of bubbles or blisters and without any shrinkage. The strength of the adhesive bond is substantially increased by keeping said united sheets at said hardening temperature for 3 to 6 hours. Shearing resistance of the adhesive bond, determined at room temperature, is at about 2.8 to 3.1 kg./sq. mm.

Plates composed of phenol-formaldehyde resin, melamine-formaldehyde resin or polyamide resin, or plates containing said resins can be glued and united in the same manner and with the same favorable result.

Example XVII

The procedure is the same as described in Example XVI, except that, in place of phthalic acid anhydride, the same amount of maleic acid anhydride is melted together with the resin of Example III. The temperature during said melting can be considerably lower, namely between 70° and 80° C. The shearing resistance of the adhesive bond between duraluminum sheets is between 2.8 kg./sq. mm. and 3.2 kg./sq. mm.

Example XVIII

The procedure is the same as described in Examples XVI and XVII. In place of the acid anhydrides used in said examples, the resin of Example III is melted together with a mixture of maleic acid anhydride and adipic acid anhydride. The following table shows the shearing resistance of adhesive bonds between duraluminum sheets in their relation to the amounts of resinous epoxide condensation product and acid hardening agents used, and the proportions of said components in the mixture.

| No. | Resin of Example III Parts by weight | Maleic acid anhydride Parts by weight | Adipic acid anhydride Parts by weight | Hardening time at 130° C., minutes | Shearing resistance kg./sq. mm. |
|---|---|---|---|---|---|
| 1 | 2 | 0.5 | 0.6 | 8 | 2.6 |
| 2 | 2 | 0.4 | 0.6 | 7 | 2.5 |
| 3 | 2 | 0.3 | 0.6 | 9 | 3.0 |
| 4 | 2 | 0.2 | 0.6 | 11 | 3.1 |
| 5 | 2 | 0.1 | 0.6 | 7 | 2.8 |

Example XIX 40 parts by weight of the resin of Example III are stirred in an oil bath at 110° C. with 5 parts by weight of maleic acid anhydride for 2½ hours. Thereby a considerable increase in viscosity is observed. 2.25 parts by weight of said resin are mixed with 0.3 to 0.5 part by weight of maleic acid anhydride or 0.7 to 0.9 part by weight of adipic acid anhydride. The mixtures harden, when heated to 130° C., within 3–10 minutes. The shearing resistance of duraluminum sheets cemented therewith is about 2.8 to 3.2 kg./sq. mm.

Example XX 40 parts by weight of the resin obtained according to Example III are heated, while stirring, to 130° C. 7.4 parts by weight of phthalic acid anhydride are added thereto and stirring is continued at 130° C. for 30 minutes. Thereby the viscosity of the mixture is considerably increased. 2.4 parts by weight of the resulting pre-condensed resin are melted together with 0.5 part by weight of polymeric adipic acid anhydride. Duraluminum sheets cemented with the resulting adhesive composition and heated to 130° C. for 30 minutes exhibit a shearing resistance of 2.8 to 3.0 kg./sq. mm.

Example XXI 7.4 parts by weight of phthalic acid anhydride are added to 40 parts by weight of the resin obtained according to Example III and the mixture is heated at 130° C. for 30 minutes while stirring. Thereby a considerable increase of the viscosity of the mixture takes place. 2.4 parts by weight of said pre-condensed resin are mixed with 0.7 part by weight of phthalic acid anhydride and 0.2 to 0.4 part by weight of a mixture of glycide esters of fatty acids with 9 to 11 carbon atoms. The resulting adhesive composition is used for cementing duraluminum sheets by hardening at 115° C. Adhesive bonds of improved elasticity and a shearing resistance of 2 to 3 kg./sq. mm. are produced.

Example XXII 40 parts by weight of the resin obtained according to Example III and 1 part by weight of piperidine are heated at 90–100° C. for 1 hour while stirring. 2 parts by weight of said pre-condensed resin are mixed with 0.5 to 0.8 part by weight of maleic acid anhydride and the mixture is melted at 80–90° C. Duraluminum sheets are cemented by means of said adhesive composition; hardening is effected by heating to 125° C. The adhesive bond exhibits shearing resistance up to 3 kg./sq. mm.

Example XXIII 10 parts by weight of the resin obtained according to Example III and 2 to 4 parts by weight of o-phenylene cyclophosphoric acid (see Helvetica Chimica Acta Vol. 34, 1951, I, pages 841–843) are melted together. The mixture is applied to duraluminum sheets which are cemented together. The adhesive composition is hardened by heating to 130° C. for 12 hours. A shearing resistance of the adhesive bond up to 3.5 kg./sq. mm. is achieved thereby.

Example XXIV 40 parts by weight of the resin obtained according to Example III are mixed with 10 to 15 parts by weight of monobutyl orthophosphoric acid. During mixing the mixture is heated. Duraluminum sheets are cemented by means of the resulting adhesive composition which is hardened at 130–150° C. Shearing resistance values of 2.0 to 2.5 kg./sq. mm. are obtained.

Example XXV 10 parts by weight of the resin obtained according to Example III and 0.5 part by weight of p-toluene sulfonic acid are mixed with each other at 60–70° C. The shearing resistance of the adhesive bonds of duraluminum sheets cemented together with this adhesive and hardened at 140° C. is about 3 kg./sq. mm.

Example XXVI 40 parts by weight of the resin obtained according to Example III are heated at 200° C. with 10 parts by weight of β,β-(4-hydroxy phenyl)-propane or 5 parts by weight of resorcinol for 10 minutes. The mixture is allowed to cool and is applied to aluminum sheets at 80–100° C. Hardening of the adhesive bond is effected by heating to 160° C. for 1 to 2 hours. The metal sheets are firmly united with each other and the shearing resistance of the adhesive bond is 2.0 to 2.7 kg./sq. mm.

Example XXVII 10 parts by weight of the resin obtained according to Example III and 5 parts by weight of a product produced by addition of 10% of maleic acid anhydride to linseed oil and reacting the mixture at 150–200° C. are mixed with 2 parts by weight of phthalic acid anhydride at 100–110° C. The shearing resistance of adhesive bonds between duraluminum sheets which are cemented together and hardened at 160° C. is about 2.5 kg./sq. mm.

Example XXVIII 3 mols of pentaerythritol dichlorohydrin are added to a solution of 4.5 mols of potassium hydroxide and 3 mols of potassium alcoholate in 3.5 liters of absolute alcohol. On distilling off well over half of the alcohol, almost the theoretical amount of potassium chloride precipitates. On sublimation in a vacuum 130–140 gm. of 2,6-dioxa-3,3-spiroheptane and 90–110 gm. of an oil boiling at 100–103° C./3 mm. Hg are obtained. Said oil is free of chlorine and shows almost the theoretical ethoxy group content of 31–32%. By said reaction an ether of the following structural formula is formed:

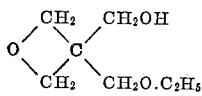

70 gm. of this oxa-cyclobutane compound and 70 gm. of 2-methylol-2-chloromethyl oxa-cyclobutane are dissolved in 40 cc. of dioxane. 8 cc. of a 4.5% boron trifluoride solution in ether are added to said solution and the mixture is heated to boiling under reflux. After boiling under reflux for only 2 hours, the reaction product becomes quite viscous. After 4 hours a sticky, ropy resin has formed, as can be ascertained by evaporating the solvent from a sample of said mixture. 30 gm. of potassium hydroxide dissolved in 300 cc. of alcohol are added to the dioxane solution. By boiling said mixture under reflux for one-half hour, 30 gm. of potassium chloride are caused to precipitate. The reaction mixture is worked up by distilling off the dioxane-alcohol mixture and washing the remaining resin with water to neutral reaction. The resin has become insoluble by the addition of said oxa-cyclobutane ether, its molecular weight is 1500, it still contains 2.5 to 3.0% of chlorine, and it has an 1,3-epoxide oxygen content of 3.0 to 3.5%.

10 parts by weight of said resin and 10 parts by weight of the resin obtained according to Example III are melted together with 7 parts by weight of maleic acid anhydride. The molten mixture is used for cementing duraluminum sheets at 135° C. The shearing resistance of the resulting adhesive bond is 2.9 to 3.3 kg./sq. mm.

Example XXIX 10 parts by weight of the resin obtained according to Example III and 2 parts by weight of 2,6-dioxa-3,3-spiroheptane are melted at about 100° C. with 4 parts by weight of adipic acid anhydride. The resulting composition is used as adhesive which is hardened at 125° C. Shearing resistance values of 2.5 to 2.8 kg./sq. mm. of adhesive bonds between duraluminum sheets are observed.

Example XXX 10 parts by weight of the resin obtained according to Example III, 3 parts by weight of tricresyl phosphate, and 5 parts by weight of maleic acid anhydride are melted together. The resulting composition is used as adhesive for cementing metal sheets at 145° C. The shearing resistance of the resulting adhesive bonds is between 2.0 and 2.5 kg./sq. mm.

Example XXXI 10 parts by weight of the resin obtained according to Example III, 2 parts by weight of dibutyl phthalate, and 1 part by weight of symmetric phthalyl chloride are mixed with each other at 20–30° C. The mixture is applied to iron sheets which are cemented by placing them upon each other and hardening at 130° C. for 12 hours. The shearing resistance of the adhesive bond between said iron sheets is 2.5 to 2.8 kg./sq. mm.

Example XXXII 20 parts by weight of the resin obtained according to Example III and 2 parts by weight of adipic acid anhydride are heated at 110° C. in an oil bath for 2 to 2½ hours while stirring. A resilient resin which is brittle at room temperature is obtained thereby. It is very finely pulverized in a ball mill and is sieved. 2 parts by weight of maleic acid anhydride and 4 parts by weight of adipic acid anhydride, which were also previously very finely pulverized in a ball mill, are admixed with said resin powder. The resulting adhesive powder mixture is applied, by means of suitable dusting devices, to surfaces to be cemented. The coated surfaces are heated to 80–90° C., i.e. the sintering temperature of the mixture, and are then united by pressure. Complete hardening can be effected at about 130° C.

Example XXXIII

The mixture of resin powder and acid anhydrides obtained according to Example XXXII is passed under pressure at 40–50° C. through an extrusion press. A molded product is obtained which is solid at room temperature and can be stored for an almost unlimited period of time. Said molded product melts on contact with hot parts of work pieces and in this manner renders possible convenient application of the resin.

Example XXXIV

A solution of 5 parts by weight of the resin obtained according to Example III and 1 part by weight of maleic acid anhydride in 5 parts by weight of dioxane is prepared. Paper weighting 20 gm./sq. m. is impregnated with said solution in such a manner that 50 gm. of resin are present in each sq. m. of paper after evaporating the dioxane. Said paper is placed between beech veneer sheets of 0.5 mm. thickness which are placed cross wise upon each other. Altogether 5 veneer sheets and 4 impregnated paper sheets placed between said veneer sheets are united by heating to 90–100° C. under a pressure of 3 kg./sq. cm. for 4 hours. The resulting plywood sheets are very suitable for building and constructing boats, automobile bodies and in the aviation industry.

Other adhesive compositions falling within the scope of the present invention can, of course, be employed in the same manner. The articles and materials to be cemented or glued are coated with said adhesive composition at the surfaces at which said articles are to be united. The coated surfaces are pressed upon each other under slight pressure at the appropriate temperature for several hours until the resin becomes completely hardened. Pressing together of said surfaces is effected by means of rubber bands, weights placed thereon, clips, screw clamps, and the like.

It is possible to glue or cement broken parts of various articles, such as telephone casings, shaving brushes, umbrella handles, porcelain figures, earthenware pots, marble plates, alabaster figures, cast-iron chess pieces, and the like.

Also, the following materials can be attached and glued to each other: cellophane to aluminum foil (laminating), one glass plate to another glass plate (safety glass), leather to sheet metal, geographical and other maps to linen cloth, felt to brass plates, sponge and foam rubber to wood, paper to Bakelite, brass letters to iron and glass, rubber stamps to wood and iron, linoleum cuts to wood, and others.

The new adhesive compositions are also exceedingly suitable for making molding compositions and laminates. They can be mixed with wood flour, wood fibers, wooden chips, rock dust and stone powder, mica, and the like. Such mixtures can then be cast, shaped, molded or otherwise shaped into plates, sheets and other articles.

Paper, cardboard, textile fabric, glass-fiber fabric, and the like, which are impregnated with such adhesive compositions can be used to produce excellent laminated articles.

While we have set forth certain theories in order to better explain our invention and have given what we believe to be the structural formulas of some of the products produced according to our invention, it is to be understood that we are not bound by these theories or the structural formulas set forth, and also that various changes and modifications may be made in the examples of our invention given for the purpose of illustration, all within the spirit of our invention and the scope of the following claims.

We claim:

1. A substantially water-insoluble composition containing a mixture of monomeric and lower molecular weight polymeric epoxy ester compounds formed by condensing an alkali metal salt of a benzene dicarboxylic acid half-ester with a lower alkanediol, said benzene dicarboxylic acid being selected from the group consisting of orthophthalic and isophthalic acids, with a vic-epoxy lower alkyl halide, said epoxy ester compounds containing at least one epoxide group and not more than two epoxide groups per individual molecules, said epoxy radical linked to said half-ester acid radical through a linkage selected from the group consisting of (1) ester linkages and (2) ether linkages to a glycerine radical linked to said half-ester acid radical through an ester linkage, said composition having an average epoxide-oxygen content between 2.3% and 7.5%, an average molecular weight between 300 and 500, an average hydroxyl number between 270 and 350, and an average saponification number between 350 and 450, said composition being hardenable by epoxy resin hardeners.

2. The composition of claim 1 wherein said acid compound is dipotassium salt of bis-(orthophthalic acid)-monobutanediol-1,4 ester and said epoxy compound is epichlorohydrin.

3. An adhesive composition comprising a resinous, hardenable epoxy resin produced by condensing an alkali metal salt of orthophthalic acid with an excess of 2 mols of epichlorohydrin per mol of said dicarboxylic acid salt

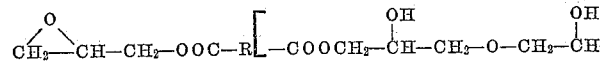

in the presence of small amounts of water up to 5% by weight of said salt at temperatures from 140° C. to 180° C. under superatmospheric pressure and in a non-oxidative atmosphere, separating the salt formed and stripping the reaction mass of volatile material by distillation under high vacuum, and from about 5% to about 20% by weight, based on the weight of the epoxy resin of an alkaline-reacting organic amine hardener containing at least one amino radical having at least one hydrogen atom bonded to the nitrogen atom.

4. An adhesive composition comprising a resinous, hardenable epoxy resin produced by condensing an alkali metal salt of isophthalic acid with an excess of 2 mols of epichlorohydrin per mol of said dicarboxylic acid salt in the presence of small amounts of water up to 5% by weight of said salt at temperatures from 140° C. to 180° C. under superatmospheric pressure and in a non-oxidative atmosphere, separating the salt formed and stripping the reaction mass of volatile material by distillation under high vacuum, and from about 5% to about 20% by weight, based on the weight of the epoxy resin of an alkaline-reacting organic amine hardener containing at least one amino radical having at least one hydrogen atom bonded to the nitrogen atom.

5. A substantially water-insoluble epoxide resin condensation product having at least one 1–2 epoxide group in the molecule and having an epoxide-oxygen content between 3.1 and 6.8%, a molecular weight between 300 and 490, a hydroxyl number between 270 and 355 and a saponification number between 392 and 450, said epoxide resin being produced by the condensation of an alkali metal salt of an orthophthalic acid and an excess of epichlorohydrin in the presence of from about 2% to about 5% of water by weight of said phthalic acid salt at temperatures from 140° C. to 180° C. under pressures of 5 to 50 atmospheres and in a non-oxidative atmosphere and stripping the reaction product of volatile material by distillation under high vacuum.

6. A substantially water-insoluble epoxide resin condensation product having at least one 1–2 epoxide group in the molecule and having an epoxide-oxygen content between 3.1 and 6.8%, a molecular weight between 300 and 490, a hydroxyl number between 270 and 355 and a saponification number between 392 and 450, said epoxide resin being produced by the condensation of an alkali metal salt of an isophthalic acid and an excess of epichlorohydrin in the presence of from about 2% to about 5% of water by weight of said phthalic acid salt at temperatures from 140° C. to 180° C. under pressures of 5 to 50 atmospheres and in a non-oxidative atmosphere and stripping the reaction product of volatile material by distillation under high vacuum.

7. A substantially water-insoluble epoxide resin condensation product having at least one 1–2 epoxide group in the molecule and having an epoxide-oxygen content of up to 6.8%, said epoxide resin being produced by the condensation of (1) an alkali metal salt of an aromatic dicarboxylic acid obtained by the esterification of about 3 mols of phthalic anhydride with about 2 mols of butanediol-(1,4), said esterified dicarboxylic acid having an acid number of about 200 to 210, and (2) an excess of epichlorohydrin in the presence of from about 2% to about 5% of water by weight of said dicarboxylic acid salt at temperatures from 140° C. to 180° C. under pressures of 5 to 50 atmospheres and in a non-oxidative atmosphere and stripping the reaction product of volatile material by distillation under high vacuum.

8. A substantially water-insoluble composition containing a mixture of monomeric and low molecular weight polymeric epoxy ester compounds, said mixture containing primarily compounds selected from the group consisting of

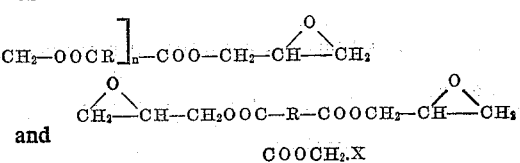

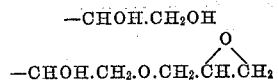

wherein $n$ is an integer from 0 to 3 and has an average value of between 0.5 and 0.9, R is a bivalent radical selected from the group consisting of 1,2-phenylene and 1,3-phenylene, X is selected from the group consisting of

—CHOH.CH₂OH

—CHOH.CH₂.O.CH₂.CH.CH₂ and

—CHOH.CH₂.O.CH₂.CHOH.CH₂OH radicals, and Y is selected from the group consisting of

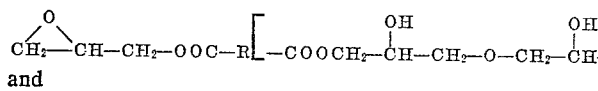

and

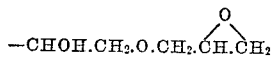

radicals, said composition having an average epoxide-oxygen content between 3.1% and 6.8%, an average molecular weight between 300 and 500, an average hydroxyl number between 270 and 350, and an average saponification number between 390 and 450, said composition being hardenable by epoxy resin hardeners.

9. The composition of claim 8 wherein R represents 1,2-phenylene.

10. The process of producing substantially water-insoluble compositions containing a mixture of monomeric and lower molecular weight polymeric epoxy ester compounds which comprises condensing an alkali metal salt of ortho-phthalic acid with an excess of a vic-epoxy lower alkyl halide in the presence of small amounts of water up to 5% by weight of said salt at temperatures from 140° C. to 180° C. under pressures of from 5 to 50 atmospheres and in a nonoxidative atmosphere and stripping the reaction product of volatile material by distillation under high vacuum, said epoxide resinous compositions having an average epoxide-oxygen content between 2.3% and 7.5%, an average molecular weight between 300 and 500, an average hydroxyl number between 270 and 350 and an average saponification number between 350 and 450.

11. The process of producing substantially water-insoluble compositions containing a mixture of monomeric and lower molecular weight polymeric epoxy ester compounds which comprises condensing an alkali metal salt of iso-phthalic acid with an excess of a vic-epoxy lower alkyl halide in the presence of small amounts of water up to 5% by weight of said salt at temperatures from 140° C. to 180° C. under pressures of from 5 to 50 atmospheres and in a non-oxidative atmosphere and stripping the reaction product of volatile material by distillation under high vacuum, said epoxide resinous compositions having an average epoxide-oxygen content between 2.3% and 7.5%, an average molecular weight between 300 and 500, an average hydroxyl number between 270 and 350 and an average saponification number between 350 and 450.

12. A hardenable resinous composition comprising (a) a mixture of monomeric and lower molecular weight polymeric epoxy ester compounds formed by condensing an alkali metal salt of a benzene dicarboxylic acid half-ester with a lower alkanediol, said benzene dicarboxylic acid being selected from the group consisting of ortho-phthalic and isophthalic acids, with a vic-epoxy lower alkyl halide, said epoxy ester compounds containing at least one epoxide group and not more than two epoxide groups per individual molecules, said epoxy radical linked to said half-ester acid radical through a linkage selected from the group consisting of (1) ester linkages and (2) ether linkages to a glycerine radical linked to said half-ester acid radical through an ester linkage, said epoxy ester compounds having an average epoxide-oxygen content between 2.3% and 7.5%, an average molecular weight between 300 and 500, an average hydroxyl number between 270 and 350, and an average saponification number between 350 and 450, and (b) from about 5% to about 60% by weight, based upon the total weight of the composition, of a curing agent selected from the group consisting of acidic and alkaline curing agents.

13. A hardenable resinous composition comprising (a) a mixture of monomeric and low molecular weight polymeric epoxy ester compounds, said mixture having a substantial amount of compounds selected from the group consisting of

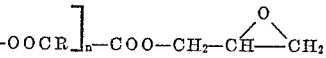

and

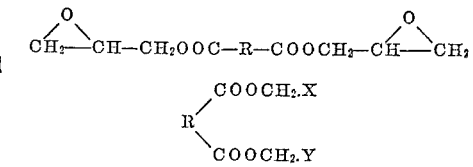

wherein $n$ is an integer from 0 to 3 and has an average value of between 0.5 and 0.9, R is a bivalent radical selected from the group consisting of 1,2-phenylene and 1,3-phenylene, X is selected from the group consisting of

—CHOH.CH₂OH

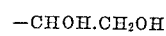

and

—CHOH.CH₂.O.CH₂.CHOH.CH₂OH radicals, and Y is selected from the group consisting of

and

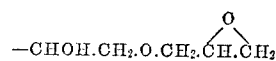

radicals, said epoxy ester compounds having an average epoxide-oxygen content between 3.1% and 6.8%, an average molecular weight between 300 and 500, an average hydroxyl number between 270 and 350, and an average saponification number between 390 and 450, and (b) from about 5% to about 60% by weight, based upon the total weight of the composition, of a curing agent selected from the group consisting of acidic and alkaline curing agents.

14. The process of producing a substantially water-insoluble composition containing a mixture of monmeric and lower molecular weight polymeric epoxy ester compounds, said composition being hardenable by epoxy resin hardeners, which comprises the steps of condensing an alkali metal salt of a benzene dicarboxylic acid half-ester with a lower alkanediol, said benzene dicarboxylic acid being selected from the group consisting of ortho-phthalic and isophthalic acids, with an excess of a vic-epoxy lower alkyl halide in the presence of small amounts of water up to 5% by weight of said salt at temperatures from 140° C. to 180° C. under pressures of from 5 to 50 atmospheres and in a non-oxidative atmosphere and stripping the reaction product of volatile material by distillation under high vacuum, said composition having an average epoxide-oxygen content between 2.3% and 7.5%, an average molecular weight between 300 and 500, an average hydroxyl number between 270 and 350, and an average saponification number between 350 and 450.

References Cited in the file of this patent

UNITED STATES PATENTS

| | | |
|---|---|---|
| 2,089,569 | Orthner et al. | Aug. 10, 1937 |
| 2,448,602 | Kester et al. | Sept. 17, 1948 |
| 2,680,109 | Stevens et al. | June 1, 1954 |
| 2,781,333 | Updegraff | Feb. 12, 1957 |
| 2,895,947 | Shokal | July 21, 1959 |

FOREIGN PATENTS

| | | |
|---|---|---|
| 500,300 | Great Britain | Feb. 7, 1939 |
| 518,057 | Great Britain | Feb. 15, 1940 |
| 648,959 | Great Britain | Jan. 17, 1951 |